United States Patent
Wang et al.

(10) Patent No.: US 8,074,243 B2
(45) Date of Patent: Dec. 6, 2011

(54) SYSTEM AND METHOD FOR GENERATING ELECTRONIC PROGRAM GUIDES

(75) Inventors: Bingfu Wang, Shenzhen (CN); Junhong He, Shenzhen (CN); Bing Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 490 days.

(21) Appl. No.: 12/202,907

(22) Filed: Sep. 2, 2008

(65) Prior Publication Data

US 2009/0049480 A1 Feb. 19, 2009

Related U.S. Application Data

(63) Continuation of application No. PCT/CN2007/000622, filed on Feb. 27, 2007.

(30) Foreign Application Priority Data

Mar. 3, 2006 (CN) .......................... 2006 1 0034141

(51) Int. Cl.
*H04N 5/455* (2006.01)
*G06F 3/00* (2006.01)
*G06F 13/00* (2006.01)

(52) U.S. Cl. ................. 725/48; 725/39; 725/46; 725/49

(58) Field of Classification Search ............ 725/31, 725/38, 46, 45, 86, 91, 110, 39, 48–49; 370/315, 370/351, 390; 709/223–224, 226, 230–232, 709/238; 707/205

See application file for complete search history.

(56) References Cited

U.S. PATENT DOCUMENTS

| 6,681,395 B1 * | 1/2004 | Nishi ............................. 725/45 |
| 6,870,570 B1 | 3/2005 | Bowser |
| 7,536,713 B1 * | 5/2009 | Bartholomew .................. 726/7 |

(Continued)

FOREIGN PATENT DOCUMENTS

CN 1539240 A 10/2004

(Continued)

OTHER PUBLICATIONS

State Intellectual Property Office of the People's Republic of China, Examination Report in Chinese Patent Application No. 2006100341410 (Jan. 29, 2010).

(Continued)

*Primary Examiner* — Hai V Tran
(74) *Attorney, Agent, or Firm* — Leydig, Voit & Mayer, Ltd.

(57) ABSTRACT

A method and system for generating electronic program guides is provided. The method comprises: sharing Electronic Program Guides (EPG) data among at least one terminal and at least two service providers (SPs) interconnected over network; searching the shared EPG data; and generating EPG for the terminal according to the searched EPG data and the customization information provided by the terminal. The system comprises at least two SPs and at least one terminal interconnected over network, where at least two SPs of the at least two SPs are provided with a middleware, and EPG data is shared among SPs or between SPs and terminals through the middleware, and at least one terminal of the at least one terminal is provided with a middleware. In embodiments of the present invention, an individualized EPG is generated according to requirements of a terminal by sharing EPG data and summarizing EPG data from a plurality of SPs.

11 Claims, 5 Drawing Sheets

U.S. PATENT DOCUMENTS

| | | | |
|---|---|---|---|
| 7,849,064 B2 * | 12/2010 | Hindle et al. | 707/705 |
| 2003/0005440 A1 | 1/2003 | Axelsson et al. | |
| 2003/0028889 A1 * | 2/2003 | McCoskey et al. | 725/91 |
| 2003/0051246 A1 | 3/2003 | Wilder et al. | |
| 2004/0078807 A1 | 4/2004 | Fries et al. | |
| 2004/0117390 A1 | 6/2004 | Karaoguz et al. | |
| 2005/0251580 A1 | 11/2005 | Tu | |
| 2007/0209049 A1 | 9/2007 | Kelly et al. | |

FOREIGN PATENT DOCUMENTS

| | | |
|---|---|---|
| CN | 1567995 A | 1/2005 |
| EP | 1 383 325 A2 | 1/2004 |
| WO | WO 03/015408 A1 | 2/2003 |
| WO | WO 03015408 A1 * | 2/2003 |
| WO | WO 2004/075543 A1 | 9/2004 |
| WO | WO 2005/076616 A1 | 8/2005 |
| WO | WO 2005/115003 A1 | 12/2005 |
| WO | WO 2005/117437 A1 | 12/2005 |

OTHER PUBLICATIONS

European Patent Office, Examination Report in European Patent Application No. 07720274.5 (Aug. 19, 2010).

State Intellectual Property Office of the People's Republic of China, English Translation of Written Opinion of the International Searching Authority in International Patent Application No. PCT/CN2007/000622 (Jun. 7, 2007).

* cited by examiner

Routing table of SP4

| | |
|---|---|
| SP4+1 | SP10 |
| SP4+2 | SP10 |
| SP4+4 | SP10 |
| SP4+8 | SP17 |
| SP4+16 | SP22 |
| SP4+32 | SP42 | ue
SYSTEM AND METHOD FOR GENERATING ELECTRONIC PROGRAM GUIDES

CROSS-REFERENCE TO RELATED APPLICATION

This application is a continuation of International Patent Application No. PCT/CN2007/000622, filed Feb. 27, 2007, which claims priority to Chinese Patent Application No. 200610034141.0, filed Mar. 3, 2006, each of which is hereby incorporated by reference in its entirety.

FIELD OF THE INVENTION

The present invention relates to information processing technology in the communication technology field, and more particularly, to a system and method for generating electronic program guides.

BACKGROUND

Multiple mixed services can be transmitted over one channel in digital television because digitalized transmission has been implemented in digital television. Therefore, digital television service is not a single television service but refers to digital services, including video, audio, image and data etc, transmitted via television transmission channels. At present, as digital television is stepping into a rapid progress stage in the world, services related to digital television increase greatly. When programs and services provided by digital television for users keep increasing, Electronic Program Guide (EPG) is becoming an indispensable tool for users.

EPG may provide users with an easy-to-use tool with friendly interface for rapidly accessing program-related information. Users may use EPG to watch information on programs to be played in the near future on one or more channels or even all channels. At the same time, EPG may provide a program classifying function for helping users to browse and select various types of programs.

A prior art method for generating EPG is as follows: a Service Provider (SP) obtains EPG data from different EPG sources every fixed interval through a server, and combines the obtained EPG data to distribute it to terminals. The EPG sources include Internet, digital program broadcasting station, and teletext service providers.

A disadvantage of the above-mentioned prior art method is that, in this method, a SP generates and provides a uniform EPG for multiple terminals. Therefore, the EPG is not customized for each terminal and cannot meet specific requirements of each terminal on EPG.

In this method, EPG data is obtained from multiple different EPG sources and the number of the acquired EPGs is large. The EPG contains much useless information due to no interaction with terminals, and therefore cannot satisfy specific selection of programs by terminals.

SUMMARY

An object of embodiments of the present invention is to provide a system and method for generating electronic program guides, which realizes interaction with the terminal and may satisfy specific selection of programs by the terminal.

The object of embodiments of the present invention is achieved by the following technical solution.

A method for generating EPGs includes: sharing EPG data among at least two SPs and at least one terminal interconnected over a network; searching the shared EPG data; and creating an EPG of the terminal according to the searched EPG data and customization information provided by the terminal.

A system for generating electronic program guides includes at least two SPs and at least one terminal interconnected over network, where at least two SPs of the at least two SPs are provided with a middleware, EPG data is shared among the SPs or between the SPs and the terminals through the middleware, and at least one terminal of the at least one terminal is provided with a middleware.

As can be seen from the above-mentioned technical solution of the present invention, embodiments of the present invention provide a system and method that can generate EPG as a user (including a SP and a terminal) requires. In embodiments of the present invention, an individualized EPG meeting terminal's requirements is generated by sharing EPG data, combining EPG data from multiple SPs, according to different requirements; and forming a complete and generalized EPG by classifying, customizing and tailoring this generalized EPG by the terminal, according to his/her own favorites, interests, and habits.

DETAILED DESCRIPTION

Embodiments of the present invention provide a system and method for generating EPG as users require.

The user described in embodiments of the present invention includes a SP and a terminal. In embodiments of the present invention, EPG data needs to be shared and interacted among SPs and between SPs and terminals, which may be realized by use of hardware or software by prior art methods for sharing data.

In embodiments of the present invention, a tag (such as IP address and domain name) of each node in network is mapped to a binary sequence node identifier NID, and the binary sequence identifier NID is uniquely allocated to this node. Identification (such as keyword, filename, and object id) of data to be shared in the system is subject to Hash operation and mapped to a binary sequence data identifier KID. For example, node identifier after Hash operation for a node with IP address 120.10.10.1 is 54, while data identifier after Hash operation for the keyword "LifAtGo" is 30. The SP stores the data identifier KID of the EPG data to be shared in a temporary memory of a subsequent node of the KID (a subsequent node of a KID refers to the first node whose identifier NID is equal to or greater than KID), and has entire control (creating, modifying and deleting) over the temporary memory while other visitors only have a right of read-only to this temporary memory.

If a node identifier is represented as m binary digits and the node identifiers for Node 0 to Node $2m-1$ are all arranged clockwise into a circle in an increasing order, the subsequent node is the nearest node clockwise. As another implementation, the data identifier KID of the shared EPG data may also be stored in a temporary memory of the previous node of this EPG data identifier KID (a previous node of KID refers to the first node whose node identifier NID is smaller than KID). Assuming that the identifier of the keyword of certain shared data is 52, and its subsequent node is the node whose node identifier is 55. With shared data being stored in such way, the impact brought to a network while a node joining or leaving the network is minimized.

Figure 1:
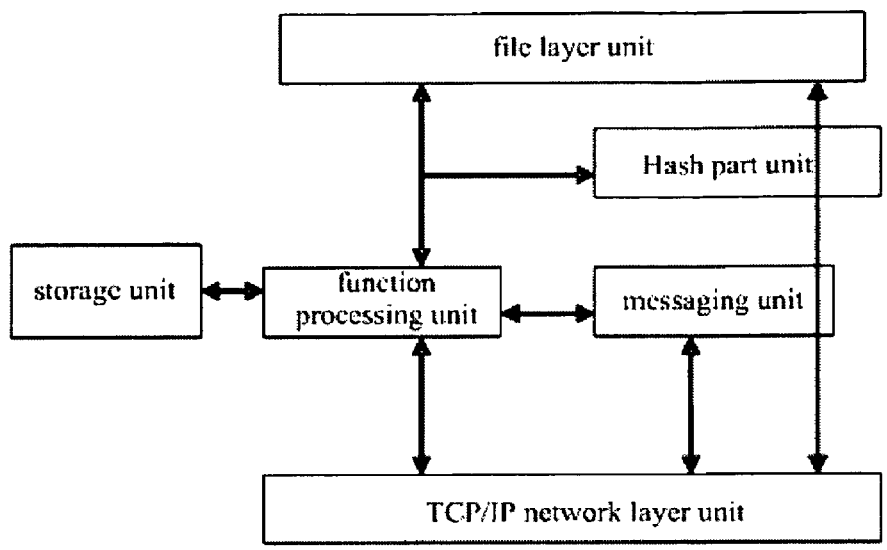
FIG. 1 is a diagram showing the structure of the information sharing middleware, according to an embodiment of the present invention.

The structure of the information sharing middleware according to an embodiment of the present invention is shown in FIG. 1. The middleware maps in a Hash operation manner the characteristic values of shared files or data into a data identifier KID. Each data identifier KID is stored on its subsequent node and the shared file is associated with this subsequent node.

The middleware includes a file layer unit, a Hash part unit, a function processing unit, a TCP/IP (Transmission Control Protocol/Internet Protocol) unit, a messaging unit and a storage unit. Functions of each unit are described below.

The file layer unit is an interface between the middleware and SPs or terminals, and SPs or terminals may share EPG data via a file layer or input keywords for searching EPG data via the file layer.

The Hash part unit provides Hash operation function that performs Hash operation on the characteristic values of the files shared by SPs or terminals and keywords input by SPs or terminals while retrieving shared files.

The function processing unit directs the cooperation among the function units of the middleware.

The TCP/IP unit connects the middleware to the basic network protocol layer.

The messaging unit transmits information to the network layer and receives information from the network layer.

The storage unit stores routing information on the current node, a subsequence list including multiple nearest subsequent nodes and keyword identifier information on some shared data. The keyword identifier information of the shared data includes keyword identifier information on shared data generated by other nodes and keyword identifier information on shared data generated by the node itself.

Figure 2:
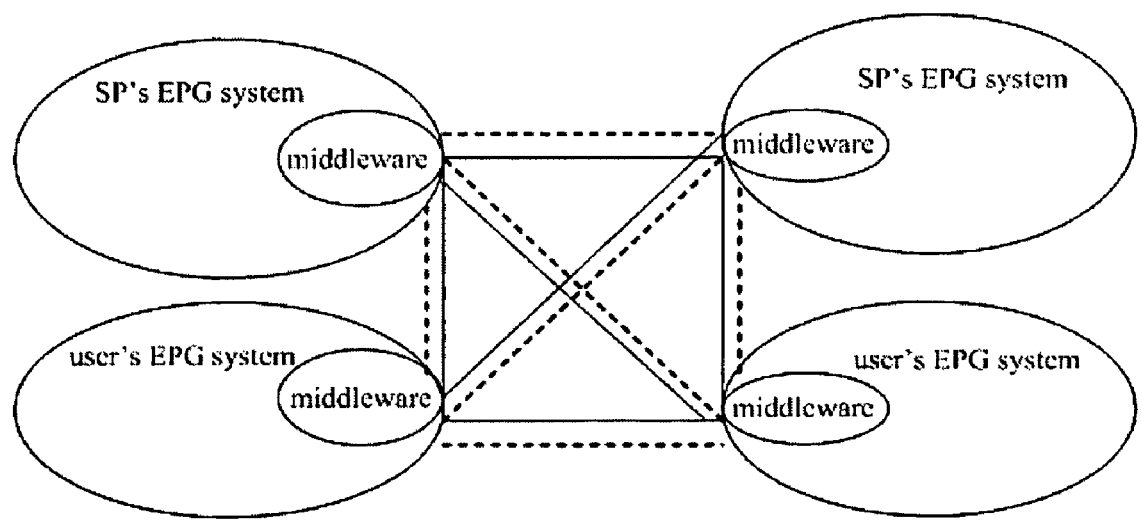
FIG. 2 is a diagram showing the principle of sharing EPG data through the information sharing middleware, according to an embodiment of the present invention.

The principle of sharing EPG data through the information sharing middleware according to embodiments of the present invention is shown in FIG. 2. In FIG. 2, solid lines refer to physical connections and dashed lines refer to logic connections.

Figures 3, 4:
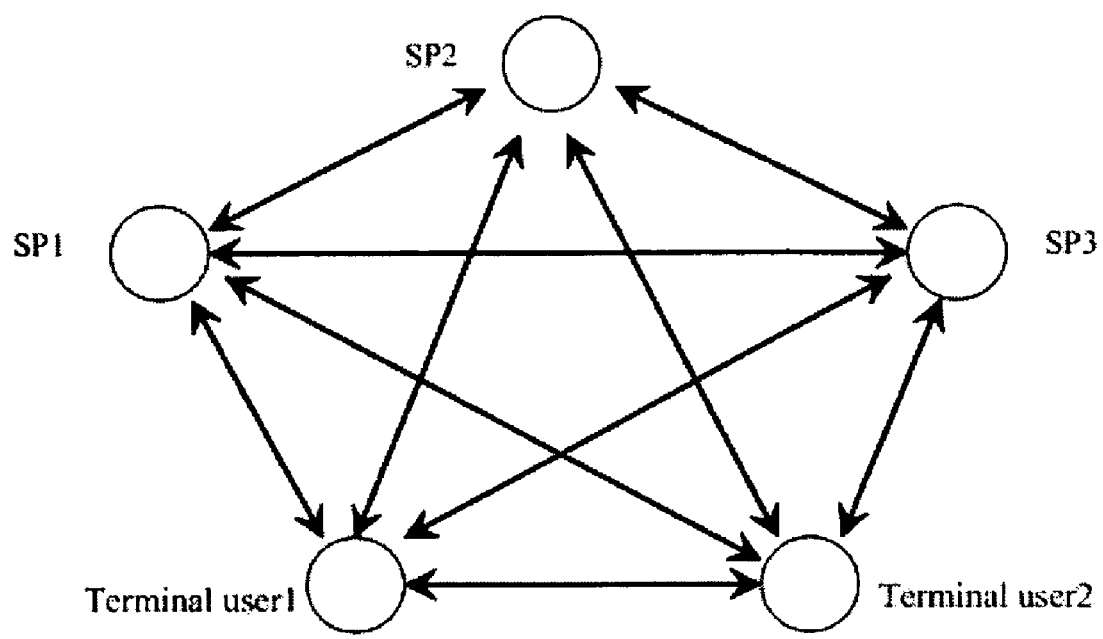
FIG. 3 is a diagram showing the information interaction among three SPs and two terminals, according to an embodiment of the present invention.
FIG. 4 is a diagram showing format and content of the routing table of the nodes, according to an embodiment of the present invention.

The system that may generates EPG as users required according to embodiments of the present invention includes at least two SPs and at least one terminal interconnected over network, where at least two SPs of the at least two SPs are provided with the information sharing middleware, and EPG data is shared among SPs or between SPs and terminals through the information sharing middleware, and at least one terminal of the at least one terminal is provided with the information sharing middleware. For example, information interaction among three SPs and two terminals is shown in FIG. 3.

In embodiments of the present invention, the processing of sharing EPG data by the information sharing middleware is as follows.

The SP node obtains data identifier KIDs of each characteristic value from EPG names and contents of their lists by mapping/Hash with DHT (Distributed Hash Table) algorithm via the middleware, and stores data identifier KIDs of each characteristic value in its subsequent node. Then, the SP node automatically searches various classes of EPG contents via the middleware. Automatic searching is for the purpose of avoiding network instability while a SP node exits and joins the network and keeping refreshing of the buffered EPG information. The middleware instantly summarize classified contents of EPG according to the SP's requirements.

In embodiments of the present invention, the processing for a node to search EPG data is as follows.

When node n does not know the subsequent node of keyword k, if n can find a node whose node identifier is closer to k, this node would know more information on this keyword. According to this characteristic, n searches for its pointer table to find the first node j whose node identifier is close to k, and queries j whether j knows which node is closer to k. By repeating this process, n finally finds the subsequent node of k.

Each node only needs to maintain a small amount of routing information by which searching efficiency may be improved. The format and content of the routing list of the node according to an embodiment of the present invention are shown in FIG. 4. In FIG. 4, the first column of the routing list is data identifier KIDs and the specific calculation formula is $(n+2k-1) \mod 2m$, where $1 \leq k \leq m$, n is the identifier of the node NID and the value of m satisfies $N \geq 2m$ (assuming that total number of network nodes is N). Values of the second column are NIDs of subsequent nodes when the node identifier is $(n+2k-1) \mod 2m$, when $1 \leq k \leq m$. As shown in FIG. 4, the pointer table of node SP4 only has 8 entries. The first entry identifier $(4+20) \mod 26=5$ and the subsequent node thereof points to 10 (SP10), the last entry identifier $(4+25) \mod 26=36$ and the subsequent node thereof points to 42 (SP42). Thus, each node only needs to know a part of node information, and this node knows more information on an adjacent node if this adjacent node is closer to this node, and the pointer table of each node does not contain location information of all keywords.

Figure 5:
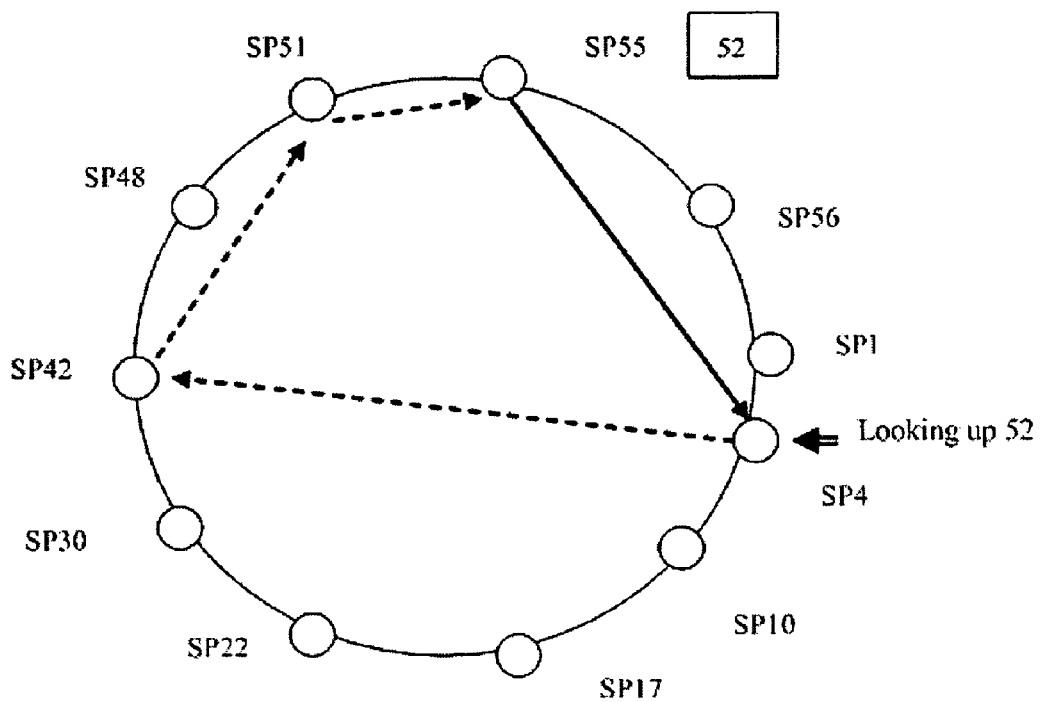
FIG. 5 is a diagram showing the processing for a node to look up EPG data, according to an embodiment of the present invention.

The processing for a node to look up EPG data according to an embodiment of the present invention is shown in FIG. 5. The SP4 (the NID of the node is 4, and assuming herein that NID of a node is the sequence number of a SP) needs to look up contents of a certain EPG. First, the content to be looked up is subject to Hash mapping to obtain the identifier (KID) of 52 of the keyword. Since the maximum pointer of the routing list of the SP4 is 42, the SP4 would ask the SP42 to find the keyword 52. In this way, the SP55 looks up its pointer table and finds that the subsequent node of keyword 52 is itself, and the SP55 tells the SP4 that SP55 is the node it is looking up. Thus, the SP4 downloads the wanted EPG data from SP55. Dashed lines in FIG. 5 show the above searching process and solid lines show the process of downloading EPG data.

To maintain the self-organizing characteristic of the system, the information-sharing middleware supports dynamic joining/exiting of a node. In embodiments of the present invention, the processing for a node to join the system is as follows.

The new node N firstly selects one member node H in the network as a guiding node and finds its subsequent node S on the system via node H. The subsequent node S divides the system resources (identifiers of EPG data) stored in its own storage unit into two parts according to the magnitude of node N's identifier (NID). The part with data identifiers (KID) smaller than node N's identifier is taken as the content stored by the newly joining node N, and the rest is kept by itself.

The node N acquires information on its previous node R through its subsequent node S and then the node N transmits a joining request message to S and R, respectively. After receiving the joining request message, nodes S and R update their previous node and subsequent node information, respectively, where node S updates its previous node as node N, and node R updates its subsequent node as node N.

Node N looks up the corresponding next hop node in sequence in its own routing list via its subsequent node S to realize initialization of its routing list.

The subsequent node S of node N transfers identifiers (KID) of EPG data keyword that belong to the new node to the new node N according to the re-divided system resource (identifiers of EPG data).

Node N transmits route update messages to other nodes in the system one by one via its subsequent node S and previous node R to allow the system to be adapted to changes of network structure.

In embodiments of the present invention, a specific processing for a node to normally exit the network is as follows.

Node Q firstly transmits a leaving request message to its subsequent node S and previous node R. After receiving the leaving request message, nodes S and R update their previous node and subsequent node information, respectively, where node S updates its previous node as the previous node of Q (node R), and node R updates its subsequent node as the subsequent node of Q (node S).

Node S updates its system resources (identifiers of EPG data), and transfers node S all identifiers (KID) of EPG data that belong to node Q according to the re-divided system resource, that is, merging system resources of node Q.

The route update messages are transmitted to other nodes in the system one by one via the subsequent node S and the previous node R of node Q to allow the system to be adapted to changes of network structure.

When a node is joining to or normally exiting from (for example normally closing a middleware program) a network, the node transmits a joining or exiting message to relevant nodes in the network. When a node exits abnormally (e.g. the node if offline or down), the middleware notifies other nodes through a "discovering-broadcasting" mechanism. For such abnormal exiting without any indication, the middleware transmits KeepAlive messages to its previous node regularly to detect whether this node is alive, and once finding out any node exits abnormally, the subsequent node of the abnormally exiting node transmits route change messages to the entire network. When the node finds that its subsequent node is invalid, it replaces the invalid node with the first normal node after the subsequent node in the subsequence list. When it is found that the data stored in this subsequent node is lost, data is re-stored in the replaced node.

In practical application, due to the weak capability of terminals and on/off status changes frequently and uncertainly, simplification of the sharing function of the middleware at the terminal side may be considered. That is, sharing and interacting of data is only carried out at the SP side, so terminal nodes do not participate in network topology and only have data searching function. In other words, terminals may realize a data search for all SPs, in the case of no data interaction and sharing among terminals.

In embodiments of the present invention, the SP and terminals' requirements on contents, templates and display styles of EPG data are referred to as customization information. Customization information provided by SPs is the first customization information, and customization information provided by the terminals is the second customization information.

Contents of the first customization information are mainly customization requirements determined by SPs according to their own styles, which mainly include EPG content requirements and template requirements determined by SPs according to their own television programs; and further include some other requirements determined by SPs according to their own style characteristics or service requirements while filtering and refining summarized EPG data. In addition, after receiving EPG customization information of terminals, SPs may also use the customization information of terminals as the customization requirements for EPG data summarizing. SPs with program creating and playing capabilities may share the EPG data and some necessary first customization information among SPs and terminals through the middleware.

The contents of the second customization information are rich and mainly include program content, customization policy/habits and EPG displaying styles. The above-mentioned program contents may be specific program names such as a movie and entertainment program, and also may be a program of a time period. A terminal may obtain time scheduling about this movie program provided by all SPs with respect to his own favorite movie, and may also customize an EPG with respect to his interested time periods. The above-mentioned customization policies/habits refer to certain operation actions set by a terminal while customizing EPG. For example, if no relevant content is searched, it may be selected to continue generating EPG or prompt the terminal and wait the terminal to instruct the next action. For the above-mentioned EPG displaying style, for example, one or more items for choice may be added in the EPG and a user enjoying scientific fiction movies may also add a link to scientific fiction movies.

The second customization information and the first customization information is not limited to the above-mentioned contents, but may be increased or decreased according to specific requirements of terminals or SPs. For example, it may be required in the customization information that EPG contents are not limited to text representation, EPG contents may be animation, music or static pictures or even a clip of movie. Terminals may require in the second customization information that actors profiles or even wonderful fragments and stories of a movie should be provided in EPG. In addition, contents of the first customization information and the second customization information may be mutually converted.

Embodiments of the present invention provide three specific implementations. In the first implementation, a SP organizes and summarizes EPG information, and generates a generalized and complete EPG data packet. Then, a terminal inputs the second customization information, and EPG is generated at the terminal side according to the EPG data packet and the second customization information.

The specific processing of the above-mentioned first implementation is as follows.

A SP collects shared EPG data via the middleware through the EPG data collecting function module. The SP should completely collect all shared EPG data currently existing in the network as possible so as to summarize complete EPG data. The SP processes the above-mentioned collected EPG data in a uniform format by an EPG data organizing module, establishes an EPG database and stores it in the EPG data storage unit. Then, the SP combines the customization requirements of multiple terminals, establishes the first customization information according to its own style requirements and inputs the first customization information to a customization information processing module, and the EPG data organizing module generates an EPG data packet according to the input above-mentioned first customization information.

The SP distributes the generated EPG data packets to terminals or shares the EPG data packets with terminals through the middleware. The terminal establishes the second customization information according to his own requirements and inputs the second customization information to the customization information processing module of the terminal. The EPG data resolution module of the terminal resolves the above-mentioned EPG data packets generated by the SP, and stores the resolved data in the EPG data storage unit by certain characteristic values including program types, time or sources.

The information feedback/analyzing module of the terminal analyzes the data in the EPG data storage unit, extracts and compares its characteristic value with the second customization information of the terminal, and determines whether terminal's requirements are satisfied. If the terminal's requirements are satisfied, the final EPG is generated according to the second customization information and data in the EPG data storage unit; if the terminal's requirements are not satisfied, the next action is selected according to the requirements in the second customization information. The next action generally includes: continuing generating EPG, even if this EPG is not the EPG that the terminal requires; giving up and not continuing generating EPG; or prompting to re-input the second customization information and re-generating EPG, etc.

In the second implementation of embodiments of the present invention, a terminal submits the second customization information with one of the SPs. The SP collects and summarizes EPG data in response to this requirement and generates a new, final EPG, and finally transmits the final EPG to the terminal. That is, the SP completes all functions and the terminal only submits the second customization information with the SP.

Figure 6:
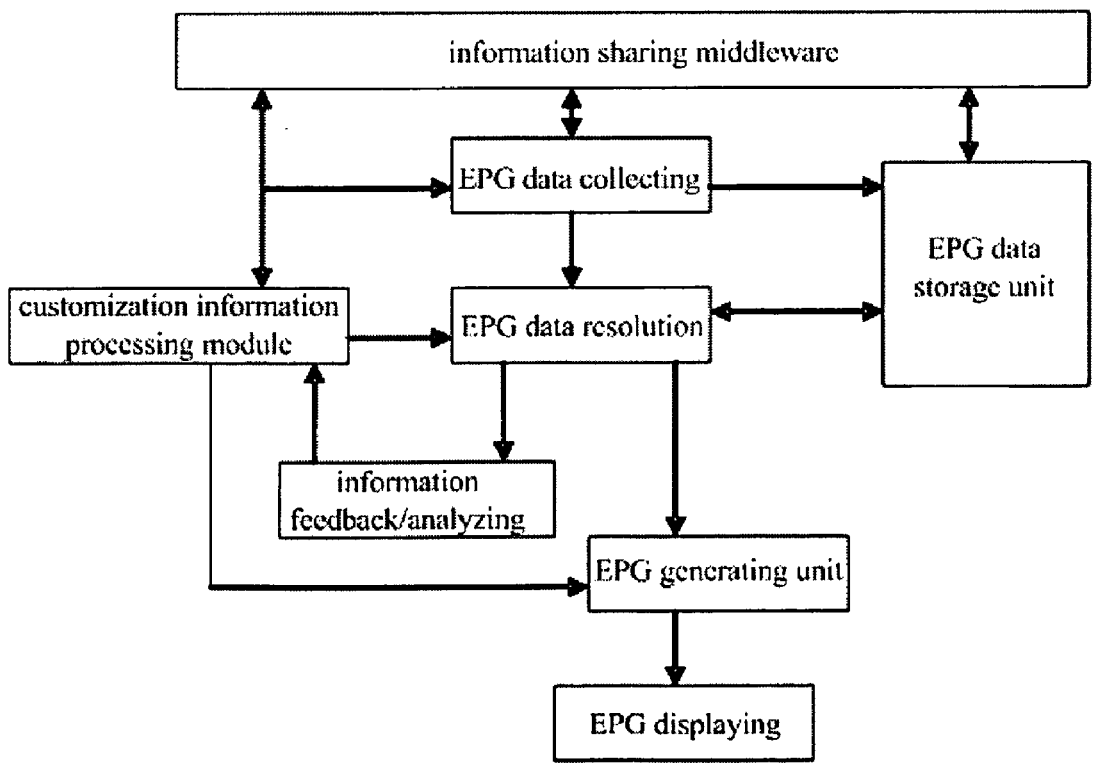
FIG. 6 is a block diagram showing the specific system functions implemented at SP side in the second implementation of the present invention.

A block diagram of the specific system functions implemented at the SP side in the second implementation of the present invention is shown in FIG. 6. The specific processing at the SP side is as follows.

A SP collects shared EPG data via the middleware through the EPG data collecting function module. The SP should completely collect all shared EPG data currently existing in the network as possible so as to summarize complete EPG data. The SP processes the collected EPG data in a generalized format by an EPG data organizing module, establishes an EPG database and stores it in the EPG data storage unit. Then, the SP combines the customization requirements of multiple terminals, establishes the first customization information according to its own style requirements and inputs the first customization information to the customization information processing module. The EPG data organizing module generates the EPG data packet according to the above-mentioned first customization information.

A terminal submits a request for generating EPG to a SP and shares the generated second customization information with the SP through the middleware. The SP obtains the second customization information of the above-mentioned terminal through the middleware and inputs the second customization information to the customization information processing module of the SP, or the SP may also acquire the customization request and the second customization information of the terminal in other ways. The EPG generating unit organizes the above-mentioned EPG data packet and generates EPG according to the above-mentioned second customization information and distributes the generated EPG to terminals, or the SP shares the EPG with the terminal through the middleware.

EPGs generated by the same SP with one uniform template according to second customization information of different terminals generally have a uniform style. The above-mentioned uniform EPG template is created by the EPG template creating module of the SP. Contents of the SP's EPG templates include the style, contents and layout of EPG interface, which are designed according to the SP's own style and service requirements, such as providing advertisements on the EPG interface. For some SPs, although shared EPG data is provided, they require that the format of EPGs finally generated by other SPs with the shared EPG data to satisfy certain requirements. In this case, the EPG template-creating module at the SP side also designs EPG templates according to these requirements.

In addition, the SP may also generate EPG templates according to the first customization information and the second customization information, and share the EPG templates with other SPs or terminals through the middleware.

Figure 7:
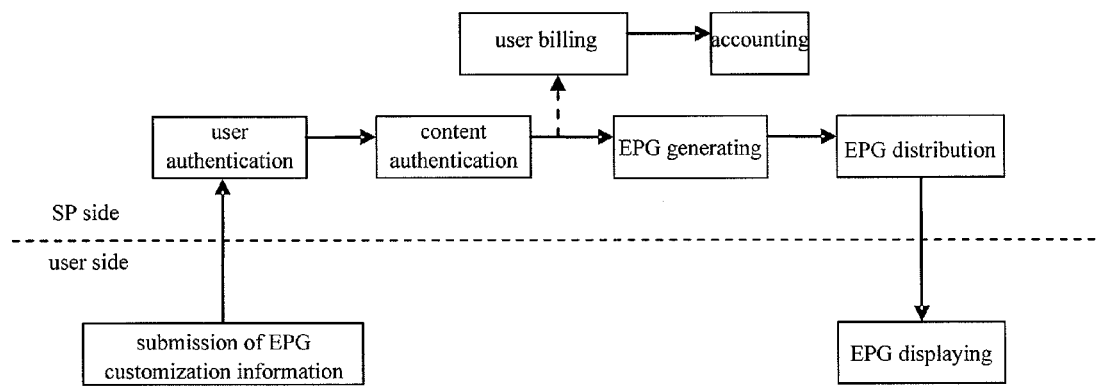
FIG. 7 is a diagram showing the specific workflow of user authentication module and accounting module, according to an embodiment of the present invention.

SPs may provide individualized EPG as a value-added service. The user authentication module and accounting module in the above FIG. 6 carry out user authentication and accounting functions, respectively. The specific workflow thereof is shown in FIG. 7. In FIG. 7, when a terminal submits a request for generating EPG to SP or the terminal submits the second customization information to SP, a user authentication refers to a process for authenticating a valid user, a content authentication refers to a process for authenticating customization information required by a terminal, including right of using contents and validity of contents. User billing and accounting is to require the user to carry out billing and accounting, which is optional, that is, providing individualized EPG for a user may be charged or free.

In the third implementation of embodiments of the present invention, the terminal collects shared EPG data, and summarizes EPG data according to his own favorites to generate a new and final EPG. The third implementation is similar to the first implementation with the difference that all tasks are completed by the terminal. It should be noted that, a search range option should be added in the second customization information to limit the collecting of EPG data. The EPG generating device at the terminal is integrated with a local device, which is a terminal apparatus with certain computation capability that can store, resolve, and analyze EPG data such as a set-top box and home computer.

Figure 8:
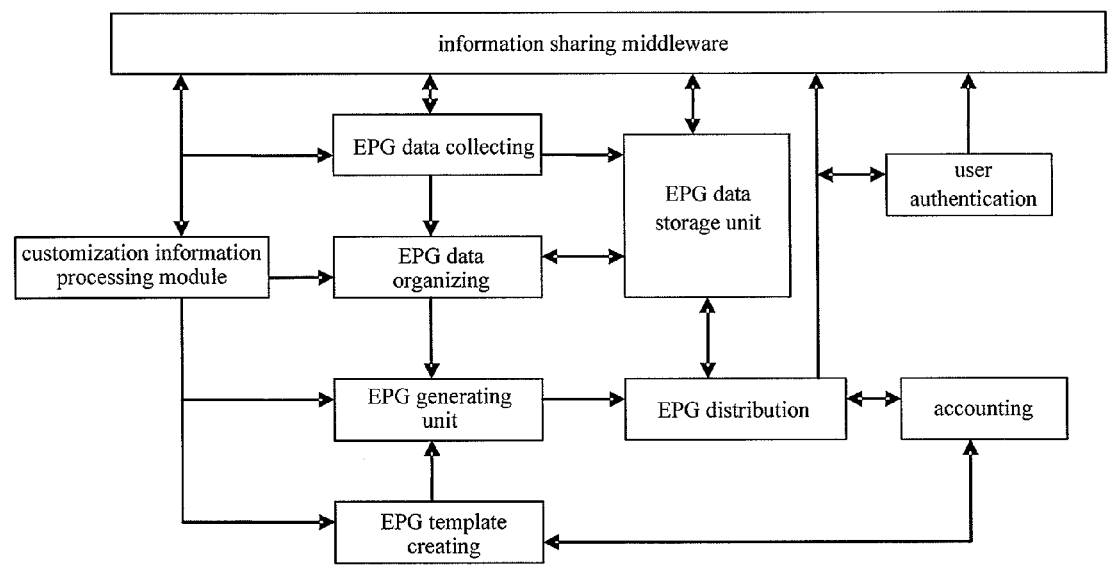
FIG. 8 is a block diagram showing the specific system functions implemented at terminal side in the third implementation of the present invention.
Figure 9:
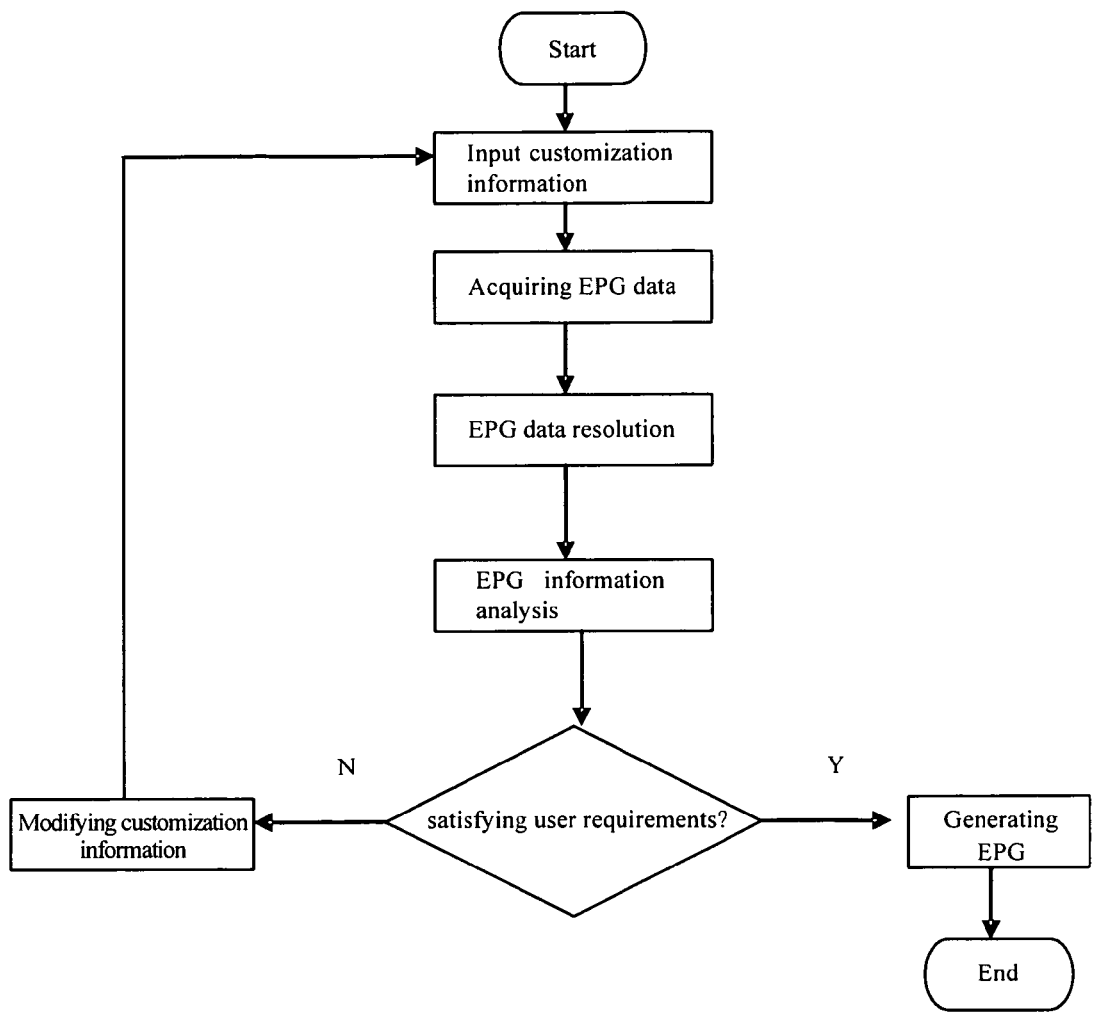
FIG. 9 is a flow chart of specific processing implemented by terminals in the third implementation of the present invention.

A block diagram of the specific system functions implemented at terminal side in the third implementation of the present invention is shown in FIG. 8. A flowchart of the specific processing implemented by terminals in the third implementation of the present invention is shown in FIG. 9. Specific processing is as follows.

The terminal establishes the second customization information according to his own requirements on EPG. Limiting conditions on search range may be added in contents of the second customization information as searching required. The EPG data-collecting function module of the terminal searches shared EPG data by the middleware according to the second customization information and stores the obtained EPG data in the EPG data storage unit.

The EPG data resolution module of the terminal resolves the EPG data in the EPG data storage unit and re-stores the resolved data in the EPG data storage unit by certain characteristic values including program types, time, or sources. Then, the information feedback/analyzing module of the terminal analyzes the data in the EPG data storage unit, extracts, and compares its characteristic value with the second customization information of the terminal, and determines whether the terminal's requirements are satisfied. If the terminal's requirements are satisfied, the final EPG is generated according to the second customization information and data in the EPG data storage unit; if the terminal's requirements are not satisfied, the next action is selected according to the requirements in the second customization information. The next action generally includes: giving up and not continuing generating the final EPG; or generating the final EPG even if this EPG is not the EPG that the terminal requires; or prompting to re-input the second customization information and generating new EPG, etc.

The EPG data organizing module at SP side has functions similar to those of the EPG data resolution module at terminal side, while the information feedback/analyzing module is specific to the terminal side, which performs the function of comparing the resolved (by the EPG data resolution module) data and the second customization information and determines whether the collected data satisfies user requirements.

In the above three implementations of the present invention, EPG data may be searched in real time at SP or terminal side to update data in real time when nodes in a network change (including joining/exiting of a node, and change of EPG data shared by nodes).

In summary, embodiments of the present invention provide a system and method for generating EPG according to terminal's requirements, which generates an individualized, more specific EPG that satisfies terminal's requirements by sharing EPG data, combining EPG data of multiple SPs, generating a complete and uniform EPG data packet by classifying, organizing, and tailoring this EPG data packet according to terminal's favorites, interests, and habits.

In embodiments of the present invention, EPG data is shared among SPs and terminals through the middleware, and terminals may also summarize EPG data with the shared EPG data to generate EPGs that they want. In addition, embodiments of the present invention also provide a method for providing individualized EPG for users as a value-added service.

The above are only exemplary embodiments of the present invention and the scope of the present invention is not limited thereto. Any variations and equivalences are apparent for those skilled in the art in the technical scope disclosed by the present invention, and these variations and equivalences should be covered by the scope of the present invention. Therefore, the protection scope of the present invention should be defined by the claims.

What is claimed is:

1. A method for generating an electronic program guide (EPG), comprising:
    sharing EPG data among at least two service providers (SPs) and at least one terminal interconnected over a network;
    searching the shared EPG data;
    creating an EPG of the at least one terminal according to the searched shared EPG data and customization information provided by the at least one terminal;
    wherein the creating the EPG of the at least one terminal according to the searched shared EPG data and customization information provided by the at least one terminal comprises:
    at the at least one terminal, parsing the searched shared EPG data to acquire a characteristic value of the searched shared EPG data, storing the characteristic value, establishing the customization information, comparing the customization information with the characteristic value, and creating the EPG of the at least one terminal according to the customization information when the characteristic value satisfies requirements of the customization information;
    wherein the sharing of the EPG data among the at least two SPs and the at least one terminal interconnected over the network comprises:
    mapping a tag of each node in the network into a node identifier and assigning the node identifier uniquely to the node; mapping the characteristic value of the EPG data to be shared into a data identifier and storing each data identifier on a subsequent node or a previous node of the data identifier, and associating the shared EPG data with the subsequent node or the previous node; the subsequent node referring to a first node whose node identifier is equal to or greater than the data identifier and the previous node referring to a first node whose node identifier is smaller than the data identifier.

2. The method of claim 1, wherein the searching the shared EPG data comprises:
    at the SP, searching the shared EPG data through the middleware, collecting the searched shared EPG data and generating an EPG data packet according to the SP's customization requirements; distributing the generated EPG data packet to the at least one terminal or sharing the generated EPG data packet with the at least one terminal via the middleware.

3. The method of claim 1, wherein the searching the shared EPG data comprises:
    at the SP, searching the shared EPG data through the middleware, summarizing the searched shared EPG data and generating an EPG data packet according to the SP's customization requirements; and
    wherein the creating an EPG of the terminal according to the searched shared EPG data and customization information provided by the at least one terminal further comprises:
    submitting by the at least one terminal a request for creating the EPG to the SP and the customization information; organizing by the SP the EPG data packet according to the customization information of the at least one terminal to generate the EPG of the at least one terminal and distributing the EPG of the at least one terminal from the SP to the at least one terminal or sharing the EPG of the at least one terminal between the SP and the at least one terminal through the middleware.

4. The method of claim 1, wherein the searching the shared EPG data comprises:
    at the at least one terminal, searching the shared EPG data through the middleware and summarizing the searched shared EPG data.

5. A system for generating an electronic program guide (EPG), comprising at least two Service Providers (SPs) and at least one terminal;
    wherein multiple SPs of the at least two SPs are provided with a middleware, EPG data is shared among the multiple SPs or between the multiple SPs and the at least one terminal through the middleware, the shared EPG data is searched among the at least two SPs and the at least one terminal, and the at least one terminal is configured to parse the searched shared EPG data to acquire a characteristic value of the searched shared EPG data, store the characteristic value, establish a customization information, compare the customization information with the characteristic value, and generate an EPG according to the customization information when the characteristic value satisfies requirements of the customization information;

the multiple SPs are used as nodes of the network, a tag of at least one of the multiple SPs is mapped into a node identifier and the node identifier is assigned uniquely to a node, the middleware is configured to map the characteristic value of the searched shared EPG data into a data identifier stored on a subsequent node or a previous node of the node, and associate the searched shared EPG data with the node at which the data identifier locates.

6. The system of claim 5, wherein the middleware comprises:

a file layer unit configured to provide an interface between the middleware and the multiple SPs or terminals, the multiple SPs share the EPG data via the file layer and the multiple SPs input keywords for searching the shared EPG data via the file layer;

a Hash part unit configured to provide a Hash operation function that performs Hash operation on keywords input by the multiple SPs or the characteristic values of the shared EPG data;

a function processing unit configured to direct cooperation among function units of the middleware; and a transmission control protocol/internet protocol unit configured to connect the middleware to a basic network protocol layer.

7. The system of claim 6, wherein the middleware further comprises:

a storage unit configured to store routing information of a current node, a subsequence list including at least one nearest subsequent node and keyword identifier information on the shared EPG data, wherein the keyword identifier information on the shared EPG data comprises keyword identifier information on the shared EPG data generated by other nodes and keyword identifier information on the shared EPG data generated by the current node itself; and a messaging unit adapted configured to enable the middleware to transmit information to the network layer and receive information from the network layer.

8. The system of claim 5, wherein the SP comprises:

a customization information processing module configured to generate customization information required by the SP and transmit the generated customization information to an EPG data organizing module;

an EPG data collecting function module configured to collect the shared EPG data through the middleware and transmit the collected shared EPG data to the EPG data organizing module;

the EPG data organizing module configured to organize the shared EPG data transmitted from the EPG data collecting function module in a uniform format, store the organized shared EPG data, generate an EPG data packet according to the customization information transmitted from the customization information processing module and transmit the EPG data packet to an EPG generating unit; and the EPG generating unit configured to organize the EPG data packet transmitted from the EPG data organizing module and generate the EPG of the at least one terminal according to the customization information of the at least one terminal.

9. The system of claim 8, wherein the SP further comprises an EPG template creating module configured to create a template for the EGP.

10. A terminal system for generating an electronic program guide (EPG), comprising:

a terminal including an EPG generating device;

wherein the EPG generating device comprises:

a file layer unit configured to provide an interface between middleware and Service Providers (SPs) or terminal users, the SPs share EPG data via a file layer and terminal users input keywords for searching the shared EPG data via the file layer;

a Hash part unit configured to provide a Hash operation function that performs Hash operation on keywords input by the EPG generating device or characteristic values of the shared EPG data;

a function processing unit configured to direct a cooperation among function units of the middleware; and a transmission control protocol or internet protocol unit configured to connect the middleware to a basic network protocol layer;

wherein the terminal comprises:

a customization information processing module configured to generate customization information required by the EPG generating device and transmit the generated customization information to an EPG generating module;

an EPG data resolution module configured to resolve the obtained shared EPG data so as to obtain characteristic values of the shared EPG data and store the characteristic values of the shared EPG data, wherein the characteristic values comprise at least one of program types, time, and sources; and the EPG generating module configured to compare the characteristic values of the shared EPG data stored in the EPG data resolution module with the customization information transmitted from the customization information processing module, and generate the EPG according to the customization information when the characteristic values satisfy requirements of the customization information.

11. The terminal system of claim 10, wherein the EPG generating device further comprises an EPG data collecting module configured to search the shared EPG data of the SP through the middleware and store the searched shared EPG data, according to the customization information of the EPG generating device.

* * * * *